United States Patent [19]

Magder et al.

[11] 3,925,302

[45] Dec. 9, 1975

[54] EMBOSSED PACKAGING MATERIAL

[75] Inventors: Jules Magder; Murray H. Reich, both of Princeton, N.J.

[73] Assignee: Princeton Chemical Research, Inc., Princeton, N.J.

[22] Filed: Nov. 4, 1971

[21] Appl. No.: 195,801

[30] Foreign Application Priority Data

July 15, 1971   Japan............................46-52771

[52] U.S. Cl. ....... 260/42.46; 260/23 H; 260/897 A; 260/897 C; 264/293
[51] Int. Cl.²..... C08K 3/20; C08K 3/36; C08K 5/09
[58] Field of Search............ 260/41 A, 41 B, 897 A, 260/93.7

[56] References Cited
UNITED STATES PATENTS

| | | | |
|---|---|---|---|
| 3,264,253 | 8/1966 | McCulloch | 260/41 A |
| 3,324,060 | 6/1967 | Scopp | 260/41 A |
| 3,455,871 | 7/1969 | Coover | 260/897 A |
| 3,574,044 | 4/1971 | Shepherd | 260/93.7 |
| 3,684,760 | 8/1972 | Goldbach | 260/28.5 A |

*Primary Examiner*—Paul R. Michl
*Attorney, Agent, or Firm*—Burgess, Dinklage & Sprung

[57]   ABSTRACT

A packaging material comprising a film or container composed of polybutene which is at least about 50% isotactic and has areas of different degrees of strain, those under greater strain standing out visibly as more opaque areas against the less opaque background of those areas which are under less strain, the areas retaining their distinctness at temperatures in excess of 140°F. The packaging material is formed and within 6 months thereafter is embossed to exceed the yield point in selected areas which become the more opaque areas. Desirably the packaging material comprises about 1 to 80%, preferably 5 to 40%, by weight of a filler which may be reinforcing or non-reinforcing, inorganic or organic, monomeric or polymeric.

11 Claims, No Drawings

EMBOSSED PACKAGING MATERIAL

This invention relates to novel embossed packaging materials in the form of film, bottles, cans, cartons and the like, which have been embossed in predetermined areas to provide areas of visible color and/or transparency contrast as well as physical contrast. This invention also relates to compositions comprising essentially isotactic polybutene-1 containing filler.

It has been discovered that unpigmented polybutene-1 may be opacified when stretched under proper conditions. These properties, however, are not obtained with polyethylene and polypropylene. These opaque films or sheets may be selectively clarified by the application of pressure or heat, as employed in standard raised-type printing operations or heat-copying processes. The selectively clarified areas obtained by these methods stand out with great contrast compared to the opaque, unclarified background.

It has also been noted that the embossed figures of films or other polymers such as polyvinyl chloride disappear when the embossed polymer film is warmed to about 140°F. This temperature also tends to distort and shrink the polymer.

The primary object of this invention is to produce embossed packaging materials by providing a method of opacifying polybutene-1 packaging materials by a lower degree of strain than is required for unfilled polybutene-1.

Another object of this invention is to produce embossed polybutene-1 packaging materials wherein the embossed figures are of visible color and/or transparency contrast as well as physical contrast to the otherwise unaffected background.

It is another object of this invention to provide embossed polybutene-1 packaging materials which embossed figures will retain their visible and/or transparency, color and physical contrasts at temperatures above 140°F.

It is a further object of this invention to provide embossed polybutene-1 packaging materials wherein the embossed figures appear white or light colored in contrast to either a colored or dark background, or an opaque, transparent or translucent background.

These and other objects of the invention have been achieved by forming a packaging material such as a film or container of polybutene. The material can thereafter be stressed, as by embossing in selected areas to exceed the yield point which areas will then stand out as opaque against the background; if the material is already opaque due to the presence of a filler, the embossing will make the selected areas visibly different from the background. There will be areas of greater and lesser strain which will correspond to areas of different visibility such as color or opacity.

The presence of inorganic and organic fillers in polybutene-1 serves to lower the degree of strain required to exceed the yield point, thus more easily producing embossed figures having visible color and/or transparency contrast to the surrounding non-embossed area.

Yield point is the elastic limit and is defined as the tensile stress at which the polymer will no longer recover to its original dimensions if the stress is relieved. The degree of strain required to exceed the yield point is the percent elongation needed to exceed the yield point.

Visible color contrast of the embossed figures can be enhanced by the incorporation of small quantities of dyes or pigments in the filled polybutene-1. The polybutene-1 polymers useful in this invention contain over 25% isotactic polymer, and preferably over 70% isotactic polymer, as measured by diethyl ether extraction. The polymer should have a melt index between 0.1 to 100 and preferably between 0.5 and 20, as measured according to the American Society of Testing Materials procedure ASTM D-1238-57 (230°C, 2160 g). Filled polymers having a melt index lower than 0.1 are difficult to process, and materials with melt indices over 100 tend to be brittle when filled.

Unlike filled polyethylene compositions, filled polybutene compositions can be embossed readily to give visible color and/or transparency contrast as well as physical contrast. Thus embossed polybutene materials can be embossed to give different combinations of color and/or transparency contrasts such as white opaque figures against grey opaque background, white opaque figures against clear or transluscent background, as well as white opaque, or light colored opaque against dark colored background.

The embossed packaging materials useful in this invention are bags for fertilizer, humus, seed corn, rock salt, crushed stone, chemicals such as fumaric acid, bleach, polymers and the like, cartons for cereal, food, meat; bottles for perfumes, oils, foods, beverages, oil-based drugs and the like; packaging films for foods, hardware, drugs, surgical equipment; cans for oils, beer, foods such as corn chips, cheese twists and the like.

The compositions used in the embossed packaging material may be prepared by known techniques of mixing, using such equipment as 2-roll mills, dry blending, Banbury mixers, twin screw or compounding extruders and the like. The embossed packaging materials may be prepared as film or sheets, by calendering or flat die extrusion, by extrusion blowing, or shaped by injection molding, blow molding, thermoforming and the like, and the figures embossed onto the film, sheet, or packaging material, such as bag, cereal container, bottle, The material can be embossed immediately to obtain excellent color and/or transparency contrast or can be aged prior to embossing. The optimum aging time depends upon the amount and type of filler used in the polybutene-1 composition. Thus, good color and/or transparency contrast was obtained in filled compositions embossed immediately after producing the extruded film. The optimum visible and/or transparency color contrast can be obtained immediately or after the film or sheet has been aged. However, we have found there is an optimum aging time for embossing the film, sheet, or packaging material. Highly filled polybutene-1 compositions cannot be embossed practically if the film, sheet, or packaging material is aged for a long period (over 2 months). The film, sheet, or packaging material has stiffened noticeably, and considerable force is required to emboss suitable figures. Thus, the optimum time for aging these films or sheets may be less than three days after forming.

The optimum aging time is approximately the time required for conversion of sufficient Form II metastable crystalline state of polybutene — which is the form obtained on cooling from the melt — to the stable crystalline Form I.

Isotactic polybutene-1 is unique among the polyolefins in that it exists in at least three polymorphic forms.

Upon quenching the polymer from the melt, a crystalline form of the polymers, commonly referred to as Form II polybutene, is obtained. Form II polybutene is well characterized by its IR spectrum, DTA curves and specific volume-temperature relationship, and other parameters and has been described as a tetragonal crystalline form. At room temperature, Form II polybutene spontaneously converts to a stable crystalline form referred to as Form I polybutene-1. The rate of conversion of Form II polymer to Form I varies somewhat with the purity of the polymer, as measured by the ash content, molecular weight of the unfilled polymer, and with the type and amount of filler. In unfilled polybutene the conversion is usually essentially complete after 3-8 days at room temperature. The application of stress or pressure to Form II polybutene also results in its conversion to Form I polymer. Form I polybutene-1 has been described as a rhombic crystalline form and is well characterized by its distinctive infrared spectrum, density, DTA curve, mechanical properties and the like.

By using appropriate fillers good visible and/or transparency color contrast between the embossed figures and the surrounding area can be obtained immediately after cooling from the forming operation. Thus, we have found that the filler also has a marked effect on the aging time.

Suitable fillers for the embossed polybutene-1 packaging materials include inorganic and organic fillers. The inorganic fillers include the various types of silica, amorphous, reinforcing, crystalline and precipitated ultra-fine silica, calcium carbonate, talc, aluminum silicates, asbestos, mica, calcium silicate, barium sulfate, litharge, barium carbonate, aluminum carbonate, magnesium carbonate, alumina, wollastanites, or any mixture of these materials. A preferred sub-group comprises silica, calcium carbonate, wollastanite and talc.

Suitable organic fillers for the embossed polybutene-1 shaped article includes the metal stearates, such as calcium, aluminum, lithium stearate, paraffinic and synthetic waxes, and polymers such as colloidal and microcrystalline cellulose, polystyrene, polyethylene, polypropylene and polyvinylchloride, and the like. A preferred sub-group comprises metal stearates, polystyrene, polyvinylchloride and polyethlene.

The quantity of fillers used can be selected according to the reinforcing action of the particular filler and may range from 1-80% of the total composition. The amount and type of filler will depend upon the specific application of the embossed article. Thus, packaging films may contain relatively low amounts (5-40%) of non-reinforcing type of filler, such as clays and calcium stearate, whereas cereal containers and cans may contain reinforcing type fillers such as fine particle size reinforcing silicas.

Reinforcing action refers to a stiffening effect of the filler upon the composition, i.e., an increase in tensile and flexural modulus, and is accompanied by a decrease in the degree of strain or percent elongation required to exceed the yield point. Thus, the type and amount of filler affects the final properties of the article, such as stiffness, tensile strength, toughness, creep resistance and also affects the strain needed to obtain visible color and/or transparency contrasts in the embossed figures. A relatively small amount of a reinforcing filler needs to be incorporated in polybutene-1 to reduce the strain required to exceed the yield point to 5 percent or less, whereas more of a non-reinforcing filler will be required to obtain comparable results. The type and amount of filler also affect the optimum aging time for obtaining excellent visible and/or transparency color contrast in the embossed figures.

Suitable dyes and pigments include: paratoner red, quinacridone red, benzidine yellow, phthalocyanine blue, phthalocyanine green, carbon black, bone black, nickel-azoyellow, azilarin maroon, thioindiogold, indanthrone blue and Helio-Bordeaux maroon. The quantity of the dye or pigment incorporated in the formulation should be sufficient to uniformly color the filled polymer without interfering with the color contrast obtained upon embossing. The quantity of the dye or pigment is usually less than 3 phr of the polymer used, and preferably between 0.01 and 1.0 phr., where phr means part by weight of additive per 100 parts by weight of resin.

The filled polybutene-1 compositions show increased temperature resistance of the embossed area over presently used materials based on PVC. For example, color contrast of the embossed area in the PVC based materials disappears when warmed to about 140°F., and distortion and shrinkage of the embossed figures occurs. Color contrast of the embossed area in polybutene-1 compositions is stable at temperatures up to about 185°F., and no distortion or shrinkage of the embossed figures takes place.

EXAMPLE 1

Polybutene-1 (260 parts) having a melt index of 0.8 and 93 percent diethyl ether insolubility is mixed with 120 parts of fine particle size talc, 20 parts of polystyrene and 0.8 part of stearic acid on a two roll mill at 225°F. The milled sheet is cut into small pieces and fed to a Dreher Grinder to obtain pellets. The polybutene pellets are extruded in a one-inch Killion extruder at an extrusion temperature of about 200°C through a rod die to obtain rod of about ¼-inch diameter. The rod extrudate is cooled by pulling through a water-filled trough by a chill roll. The rod is cut into 12-inch lengths and is fed again to a Dreher Grinder to obtain pellets. The polybutene pellets are extruded in a 1-inch Killion extruder through a 6-inch film die at a temperature of about 210°C. The film extrudate is dropped onto a water-cooled chill roll to obtain 2.5 ml. film. The film is embossed immediately after cooling to obtain white opaque figures against a transluscent background. The embossed film is useful as bread wrapping.

EXAMPLE 2

Polybutene-1 (450 parts) having a melt index of 1.8, 120 parts of precipitated ultra-fine silica, 30 parts of polystyrene and 1.2 parts of stearic acid is converted into 5-mil film by the procedure given in Example 1. After one day, the film is embossed to give white opaque figures against a transluscent background.

EXAMPLE 3

Polybutene (450 parts), 120 parts of precipitated ultra fine silica, 30 parts of polystyrene, 1.5 parts of ultrazin yellow*, and 1.2 parts stearic acid is converted into 8-mil film by the procedure given in Example 1. After one day, the film is embossed to give white opaque figures against a yellow transparent background.

* derived from tetrachloroisoindolinone

EXAMPLE 4

Polybutene (332.5 parts), calcium carbonate (332.5 parts), 35 parts of polystyrene and 1.4 parts of stearic acid is converted into 15-mil film by the procedure given in Example 1. The film is embossed immediately after cooling to give white opaque figures against a transluscent background.

EXAMPLE 5

Polybutene (300 parts) having a melt index of 1.8, 80 parts of wollastonite, 20 parts of polystyrene, and 0.8 part of stearic acid is converted into 1.5 mil film by the procedure given in Example 1. The film is embossed immediately to give white opaque figures against a transluscent background.

EXAMPLE 6

Polybutene (480 parts), 102 parts of calcium stearate, 18 parts of irgazin red* and 1.2 parts of stearic acid is converted into 12-mil film. After an aging period of two days, the extruded 12-mil film is embossed to give pastel red opaque figures on a deep red opaque background.
* derived from tetrachloroisoindolinone

EXAMPLE 7

Polybutene (332.5 parts) having a melt index of 1.8 and 93 percent diethyl ether insolubility is mixed with 332.5 parts of calcium carbonate, 35 parts of polystyrene and 1.4 parts of stearic acid on a two roll mill at 225°F. About three grams of the milled sheet is molded at 160°C to give a 10-mil sheet. The sheet is embossed immediately after cooling to room temperature to give white opaque letters against a grey transluscent background. The composition can be formed into an oil can and embossed.

EXAMPLE 8

Polybutene-1 (450 parts) having a melt index of 0.8 is mixed on the mill with 120 parts of precipitated silica of ultra fine particle size, 30 parts polystyrene, 1.5 parts ultrazin violet* pigment and 1.2 parts of stearic acid. The milled stock is molded at 160°C to give 9 mil film. After an aging period of 1 day the film is embossed to give white opaque figures against a dark purple background. The composition can be blow molded into a shampoo bottle and embossed.
* derived from tetrachloroisoindolinone

EXAMPLE 9

Polybutene (500 parts) having a melt index of 0.8 is mixed on the mill with 99.6 parts of calcium stearate and 1.2 parts of stearic acid. The milled stock is molded at 160°C to 5 mil film. The film is embossed immediately to give white opaque figures against a transparent background.

EXAMPLE 10

Polybutene (227 parts) is mixed on the mill with 123 parts amorphous silica and 0.7 part of stearic acid. The sheet is molded to give a 9-mil film. The film is embossed immediately to give white opaque figures against a transluscent background.

EXAMPLE 11

Polybutene (50 parts) is mixed on the mill with 25 parts of polyvinyl chloride and 25 parts of calcium carbonate. The sheet is molded to give an 8-mil film. The film is embossed the same day to give white opaque figures against a transluscent background.

EXAMPLE 12

Polybutene (50 parts) is mixed on the mill with 25 parts of high density polyethylene and 25 parts of calcium carbonate. The sheet is molded to give an 8-mil film. The film is embossed the same day to give white opaque figures against a transluscent background.

EXAMPLE 13

Polybutene (50 parts) is mixed on the mill with 25 parts of polystyrene and 25 parts calcium carbonate. The sheet is molded to give a 10-mil film. The film is embossed the same day to give white opaque figures against a transluscent background. The composition can be formed into a cereal carton and embossed.

EXAMPLE 14

Polybutene (62.5 parts) is mixed with 6.2 parts polystyrene and 31.3 parts of calcium carbonate. The sheet is molded to give a 10-mil film. The film is embossed the next day to give white opaque figures against a transluscent background.

It will be appreciated that the instant specification and examples are set forth by way of illustration and not limitation and that various modifications and changes may be made without departing from the spirit and scope of the present invention.

What is claimed is:

1. The process which comprises forming packaging material such as a film of container of polybutene which is at least 50% isotactic and contains 5 to 80% by weight of a filler and thereafter embossing said packaging material so as to exceed the yield point in selected areas which then stand out as more opaque against a less opaque or transparent background, which areas retain their distinctness at temperatures in excess of 140°F.

2. Process according to claim 1, wherein the packaging material comprises a film and contains about 5 to 40% by weight of a filler.

3. Process according to claim 2, wherein embossing is effected within three days after forming the container.

4. Process according to claim 1, wherein said filler is selected from the group consisting of metal stearates, polystyrene, polyvinylchloride and polyethylene.

5. Process according to claim 1, wherein said filler is selected from the group consisting of silica, calcium carbonate, wollastanite and talc.

6. process according to claim 1, the composition containing at least about 0.01 parts by weight of dye or pigment per 100 parts by weight of polybutene.

7. A packaging material comprising a film or container composed of polybutene which is at least about 50% isotactic, the film comprising about 5 to 80% by weight of a filler and having areas of different degrees of strain, the yield point having been exceeded in selected areas which are under greater strain and which stand out visibly as more opaque areas against the less opaque background of those areas which are under less strain, the areas retaining their distinctness at temperatures in excess of 140°F.

8. A packaging material according to claim 7 wherein the packaging material comprises a film and contains about 5 to 40% by weight of a filler.

9. A packaging material according to claim 7 wherein said filler is selected from the group consisting of metal stearates, polystyrene, polyvinylchloride and polyethylene.

10. A packaging material according to claim 7, wherein said filler is selected from the group consisting of silica, calcium carbonate, wollastanite and talc.

11. A packaging material according to claim 7, containing at least about 0.01 parts by weight of dye or pigment per 100 parts by weight of polybutene.

* * * * *